(12) United States Patent
Buttle

(10) Patent No.: US 9,505,457 B2
(45) Date of Patent: Nov. 29, 2016

(54) AUXILIARY CHILD BICYCLE SEAT

(71) Applicant: Ritchie James Buttle, Western Cape Province (ZA)

(72) Inventor: Ritchie James Buttle, Western Cape Province (ZA)

( * ) Notice: Subject to any disclaimer, the term of this patent is extended or adjusted under 35 U.S.C. 154(b) by 0 days.

(21) Appl. No.: 14/916,115

(22) PCT Filed: Aug. 11, 2014

(86) PCT No.: PCT/IB2014/063839
§ 371 (c)(1),
(2) Date: Mar. 2, 2016

(87) PCT Pub. No.: WO2015/033241
PCT Pub. Date: Mar. 12, 2015

(65) Prior Publication Data
US 2016/0194043 A1    Jul. 7, 2016

(30) Foreign Application Priority Data

Sep. 4, 2013 (ZA) .................................. 2013/06622

(51) Int. Cl.
*A47C 1/08* (2006.01)
*B62J 1/16* (2006.01)

(52) U.S. Cl.
CPC .. *B62J 1/167* (2013.01); *B62J 1/16* (2013.01)

(58) Field of Classification Search
CPC ....................................................... B62J 1/167
USPC ................ 297/250.1, 195.1, 195.11, 440.13, 297/440.14
See application file for complete search history.

(56) References Cited

U.S. PATENT DOCUMENTS

| 473,681 | A | | 4/1892 | Upson | |
|---|---|---|---|---|---|
| 615,756 | A | | 12/1898 | Shackelton | |
| 1,479,406 | A | | 1/1924 | Brent | |
| 2,354,881 | A | * | 8/1944 | Rehn | B62J 1/167 297/211 |
| 2,448,867 | A | * | 9/1948 | Darden | B62J 1/167 280/202 |
| 3,738,704 | A | * | 6/1973 | Smith | B62J 1/28 297/195.13 |
| 4,305,532 | A | * | 12/1981 | Reminger | B62J 7/02 224/415 |

(Continued)

FOREIGN PATENT DOCUMENTS

| CH | 216095 A * 7/1941 ............. B62J 1/167 |
|---|---|
| DE | 363789 C * 11/1922 ............. B62J 1/167 |

(Continued)

OTHER PUBLICATIONS

Written Opinion issued in International Application Serial No. PCT/IB2014/063836 on Nov. 24, 2014.

*Primary Examiner* — Laurie K Cranmer
(74) *Attorney, Agent, or Firm* — Haugen Law Firm PLLP

(57) ABSTRACT

An auxiliary child bicycle seat is provided comprising multiple components (2, 9, 16, 22, 42, 43, 47) in the form of generally flat foam bodies. Two operatively upright seat support panels (9, 42) support a seat panel (16, 47) that also attaches to a front panel (22, 43). The front panel (22, 43) is adapted to operatively extend downwards from a front region of the seat and the front panel (22, 43) has a central divide (23, 55) such that a portion of the front panel (22, 43) is located on each side of a top tube (3, 50) in use and wherein the front panel (22, 43) provides a footrest (24, 51) on each side of the divide (23, 55). The components (2, 9, 16, 22, 42, 43, 47) may be cut from a prefabricated semi-rigid sheet of foam material having a suitable thickness and rigidity or they may be cast or moulded from a suitable foam material having an integral skin. The seat attaches to a bicycle using appropriate straps (4, 49, 56, 57).

15 Claims, 5 Drawing Sheets

(56) References Cited

U.S. PATENT DOCUMENTS

| | | | | |
|---|---|---|---|---|
| 4,969,658 A * | 11/1990 | Levarek | ................... | B62J 1/167 |
| | | | | 280/202 |
| 4,969,958 A | 11/1990 | Mombrun et al. | | |
| 5,052,704 A | 10/1991 | Nauman | | |
| 5,104,188 A * | 4/1992 | Jefferson | ................... | B62J 1/167 |
| | | | | 280/202 |
| 5,275,467 A * | 1/1994 | Kawecki | ................ | A47C 4/021 |
| | | | | 297/411.29 |
| 6,179,183 B1 | 1/2001 | Kloster | | |
| 6,264,223 B1 * | 7/2001 | Loewke | ..................... | B62J 1/16 |
| | | | | 224/426 |
| 6,685,265 B1 * | 2/2004 | Moore, Jr. | ................. | B62J 1/00 |
| | | | | 280/288.4 |
| 7,134,728 B1 * | 11/2006 | Buhrman | ................. | A47C 3/34 |
| | | | | 297/440.14 |
| 7,523,989 B2 * | 4/2009 | Wieland | ................ | A47C 4/021 |
| | | | | 297/188.08 |
| 2001/0045768 A1 * | 11/2001 | LaBlance | ................ | A47C 5/12 |
| | | | | 297/440.14 |
| 2004/0061361 A1 | 4/2004 | Jefferson | | |
| 2006/0138815 A1 * | 6/2006 | Sosa | ........................ | B62J 1/167 |
| | | | | 297/195.13 |
| 2007/0114821 A1 * | 5/2007 | Sosa | ........................ | B62J 1/167 |
| | | | | 297/195.13 |
| 2011/0266320 A1 | 11/2011 | Hagedoorn | | |

FOREIGN PATENT DOCUMENTS

| | | | | |
|---|---|---|---|---|
| EP | 0833767 | | 4/1998 | |
| EP | 1029775 | | 8/2000 | |
| FR | 416359 A * | | 10/1910 | ............. B62J 1/167 |
| FR | 2574040 | | 6/1986 | |
| GB | 191326770 | | 0/1914 | |
| GB | 190911464 | | 2/1910 | |
| GB | 186944 | | 10/1922 | |
| GB | 506192 | | 5/1939 | |
| JP | 11287406 | | 11/1914 | |
| JP | 3382826 B2 * | | 3/2003 | ............. B62J 1/167 |
| JP | 2006248382 | | 9/2006 | |
| NL | DE 202013011093 U1 * | | 2/2014 | ................ B62J 1/16 |

* cited by examiner

AUXILIARY CHILD BICYCLE SEAT

FIELD OF THE INVENTION

This invention relates to an auxiliary child bicycle seat for use in conveying a young child together with a cyclist for transport or recreational purposes.

More particularly, but not exclusively, the invention aims at enabling a recreational cyclist, for example one riding a mountain bike, to convey a child with the cyclist.

BACKGROUND TO THE INVENTION

Numerous different proposals have been put forward to provide an auxiliary child bicycle seat on a bicycle so that a child can be transported together with a cyclist. Many of these provide the seat behind the cyclist but applicant believes that such a position is undesirable from a control and monitoring point of view.

Other proposals have made use of the top tube of a bicycle frame to support a specially configured child seat.

U.S. Pat. No. 4,969,958 describes a child seat that is supported by a split tube that encircles the top tube of the frame and has arms extending downwards to support footrests. The downwardly extending arms are attached to the down tube of the frame. The arrangement is somewhat complicated and expensive to construct.

U.S. Pat. No. 5,052,704 describes an arrangement in which a large diameter cylindrical sponge body is supported on the top tube of a bicycle frame which is accommodated in a slot in the sponge body. Because there is no other part, the proposal is that the cyclist wears a harness by means of which a child may be secured to the cyclist. This arrangement is also complicated and not of particular note for any features.

Other prior proposals include a number of arrangements that rely on an anchorage that is secured to the head tube of a bicycle frame. Such arrangements include those described in published US patent applications 20040061361 and 20110266320.

Other than the arrangement of U.S. Pat. No. 5,052,704, all of the arrangements described run the risk of damaging or at least defacing to some extent the bicycle, especially the top tube and in some cases the head tube of the bicycle frame.

There is scope for a more simple arrangement.

In what follows, the term "top tube" is not intended to limit the scope of the invention which should be quite apparent to anyone of reasonable skill in the art. The term "top tube" is thus intended to apply not only to a conventional men's bicycle in which the top tube of the bicycle frame is generally horizontal, but also to any other appropriately orientated upper frame member such as the upper tube of two vertically spaced and approximately parallel tubular frame members of a so-called step-through bicycle frame that is particularly aimed at use by ladies and as a utility bicycle or that of the so-called mixte (unisex) bicycle frame.

SUMMARY OF THE INVENTION

In accordance with this invention there is provided an auxiliary child bicycle seat comprising multiple components each of which is in the form of a generally flat foam body and wherein the components include two operatively upright seat support panels, a seat panel having formations cooperating with each of the seat support panels; and a front panel that has at least one formation cooperating with a co-operant formation on the seat panel or on the seat support panels or both, wherein the front panel is adapted to operatively extend downwards from a front region of the seat and the front panel has a central divide such that a portion of the front panel is located on each side of a top tube in use and wherein the front panel provides a footrest on each side of the divide.

Further features of the invention provides for the components to be either cut, such as by die-cutting, from a prefabricated semi-rigid sheet of foam material having a suitable thickness, generally within the range of 20 mm to 40 mm with a preferred thickness of about 30 mm and a suitable rigidity as determined by a Shore hardness in the range of 20 to 40 and preferably from 25 to 30 on the A scale, or alternatively, for the components to be cast or moulded from a suitable foam material such as an integral skin polyurethane foam having a similar suitable thickness and rigidity; and for there to be multiple formations on the seat support panels for use at different angles of inclination according to an angle of inclination of a top tube of a bicycle frame to which the auxiliary child bicycle seat is attached in use.

Still further features of the invention provide for the formations on the components to assume the form of tongues each of which is configured to fit neatly into a cooperating aperture through the other of two attached components; for at least selected tongues to be configured to pass through a cooperating aperture and to have an enlarged head region for engaging behind the remote edges of the cooperating aperture; for the components to have slots through them for receiving straps for holding the auxiliary child bicycle seat to the top tube of a bicycle frame, in use, and for holding the various components together, as may be necessary, for providing a lap strap for a child seated on the seat panel, in use, for holding a child's ankles captive relative to the footrests, and for holding the front panel relative to a head tube of a bicycle frame or handlebar stem and for holding the central divide closed; and for the seat panel to have a central recess in a leading edge thereof for locating it relative to a head tube of a bicycle frame or a handlebar stem or both.

In a first variation of the invention the components include a mounting unit for attachment to the top tube of a bicycle frame, the mounting unit having formations in registration with co-operant formations on each of the two seat support panels to maintain their separation and generally parallel arrangement in use. In such an instance the mounting unit will generally have slots passing through it whereby it can be strapped to the top tube of a bicycle frame. In such an instance a forward edge of each of the seat support panels does not need to reach the front panel and can be spaced rearwards thereof. The mounting unit may have laterally extending tongues generally with heads for engaging in cooperating apertures in the seat support panels.

In a second variation of the invention the mounting unit is omitted and the seat support panels have a forward edge with formations in the form of tongues for connecting them to the front panel, typically in a lower region thereof. A series of angularly spaced slots is provided through the seat support panels to enable a strap to be threaded through them in order to strap them to a top tube of a bicycle frame with two passes of the strap being positioned one above and one below the relevant top tube of the bicycle frame.

In all instances in which slots are provided, one of a pair of cooperating slots can be in the form of a simple slit in the panel through which a strap can be passed, typically at factory level, so that it is held captive by friction relative to that slot and can be threaded through the co-operating slot as and when required. Also, in all instances the thickness of all of the panels can be the same so that all panels can be cut from a single thickness sheet of material. The invention also provides an auxiliary child bicycle seat conforming in general shape to an assembled child bicycle seat as claimed in any one of the preceding claims and comprising multiple panels each of which is in the form of a generally flat foam body and wherein the panels include two operatively upright seat support panels, a seat panel supported by the seat support panels; and a front panel that is attached to the seat panel or the seat support panels or both, wherein the front panel is adapted to operatively extend downwards from a front region of the seat and the front panel has a central divide such that a portion of the front panel is located on each side of a top tube of a bicycle frame in use and wherein the front panel provides a footrest on each side of the divide, wherein at least the seat panel, the seat support panels and then front panel are integrally moulded.

Such an auxiliary child bicycle seat can be substantially similar to that defined above apart from the fact that the panels are formed integral with each other in a casting or other moulding process thereby rendering the inter-engaging formations redundant.

In order that the invention may be more fully understood, one particular embodiment of each of the two variations thereof and their practical implementation will now be described with reference to the accompanying drawings.

DETAILED DESCRIPTION WITH REFERENCE TO THE DRAWINGS

Figure 1:
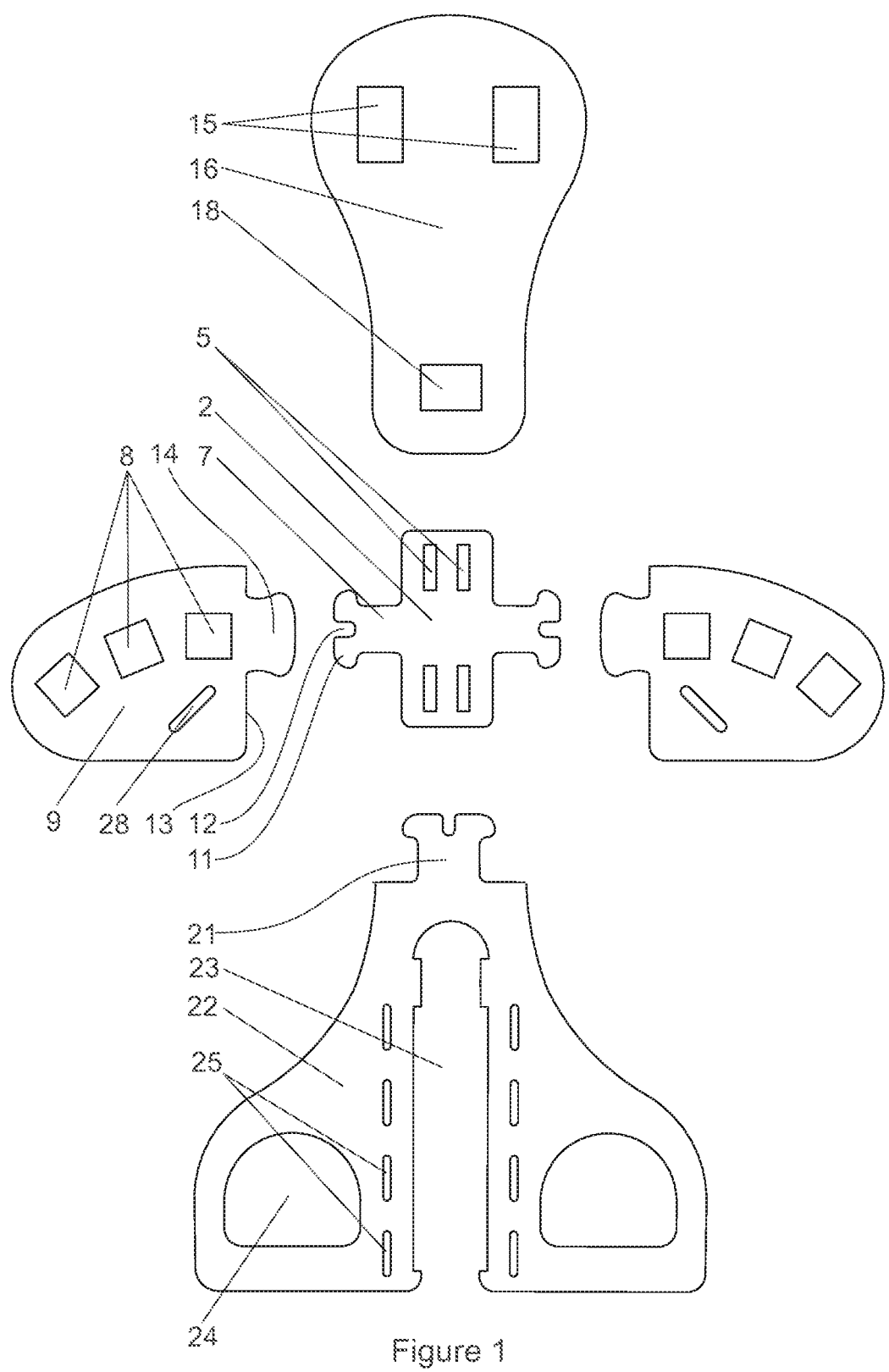
FIG. 1 is an exploded plan view showing the die-cut components of one embodiment of the of auxiliary child bicycle seat according to the first variation of the invention.
Figure 2:
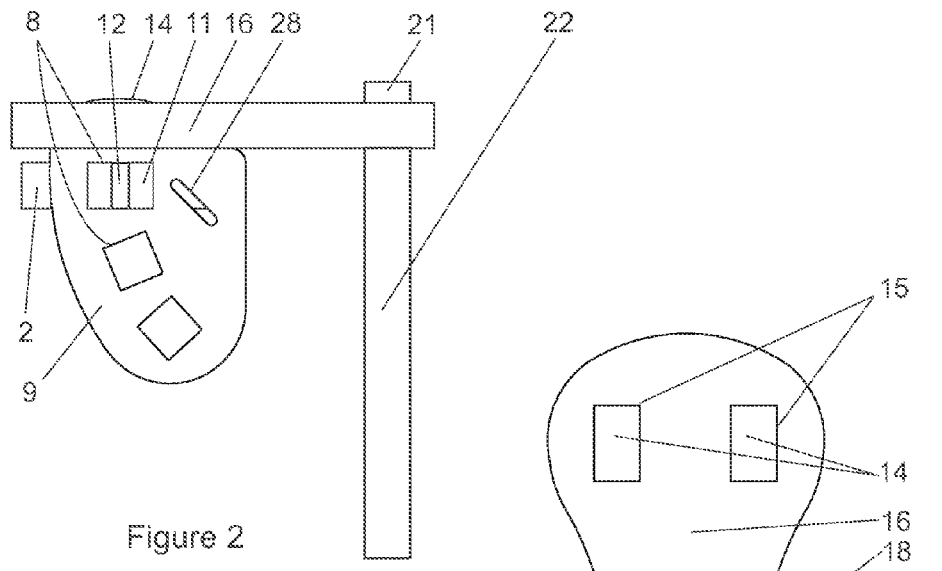
FIG. 2 is a side view of the assembled components illustrated in FIG. 1.
Figure 3:
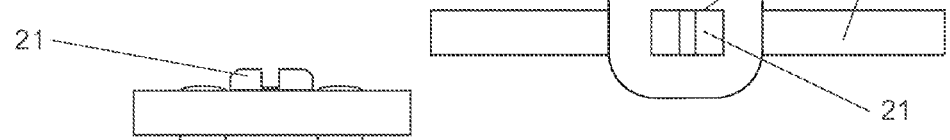
FIG. 3 is a plan view of the assembled components illustrated in FIGS. 1 and 2.

In the embodiment of the first variation of the invention that is illustrated in FIGS. 1 to 5 of the drawings, an auxiliary child bicycle seat comprises multiple components each of which is in the form of a generally flat foam body that may be die-cut from a prefabricated semi-rigid sheet of foam material having a suitable thickness and rigidity and providing satisfactory physical properties. In tests conducted to date, a 30 mm thick sheet of tough closed cell foam material made from a blend of ethylene vinyl acetate and polyethylene was employed. The material had a Shore A hardness of 25 to 30. The material used in this particular embodiment of the invention is one that is suitable for use as the soles of flip-flop sandals.

Alternatively, the components may be cast or moulded from a suitable foam material such as suitable polyurethane foam that typically has an integral skin.

The components in this instance include a rectangular mounting unit (2) for attachment to the top tube (3) of a bicycle frame that can be firmly strapped to the top tube by means of straps (4) passing through pairs of slots (5) through the mounting unit. The straps may have end regions that are interconnected using any suitable type of buckle (6).

The mounting unit has an integral tongue (7) on each of two opposite sides thereof with the tongues being configured to fit neatly and relatively tightly into a selected cooperating rectangular aperture (8) through each of two opposite operatively upright seat support panels (9) with the mounting unit forming a space between the seat support panels.

These tongues are configured to pass right through a cooperating aperture (8) and have an enlarged head region (11) for engaging behind the remote edges of the cooperating aperture to form a positive attachment and prevent the tongue from being withdrawn inadvertently from the aperture. The enlarged head region may be provided with a central bifurcating cut out (12) to enable the head to be forced through the aperture in either direction corresponding to assembly or disassembly.

Each of the seat support panels has three juxtaposed apertures (8) arranged in an arc so that an appropriate aperture can be selected to provide a generally horizontal seat panel orientation irrespective of the inclination of the top tube to which the mounting unit is to be attached for use. The mounting unit can thus be located at different angles of inclination according to the angle of inclination of the top tube to which the mounting unit is operatively attached.

Each of the seat support panels also has a straight operatively upper edge (13) from which an integral tongue (14) extends and these tongues are positioned to correspond with apertures (15) in a seat panel (16).

The seat panel has an aperture (15) for cooperation with each of the tongues (14) of the seat support panels to hold the seat panel firmly against a straight operatively upper edge of the seat support panel. The seat panel also has a central forward aperture (18) for receiving a tongue (21) at the upper end of a front panel (22) that is adapted to operatively extend downwards from a front region of the seat panel.

The front panel has a central divide (23) such that a portion of the front panel is located on each side of a top tube in use. The front panel provides an aperture (24) shaped to serve as a footrest on each side of the divide in a lower region of the front panel. The configuration of an aperture is considered to be advantageous over many prior art devices in that a child's foot cannot slip sideways off the footrest and also cannot be injured by the footrest as it is of the relatively soft material.

There is a series of slots (25) through the front panel on each side of the divide so that the two edges of the divide material can be joined after installation on a bicycle by means of one or more straps (26) and associated buckles.

Finally, a lap strap (27) is provided for a child seated on the seat panel, in use, the lap strap having each of two ends anchored one to each of the seat support panels with a slot (28) through which each part of the lap strap can extend. The lap strap may have any suitable type of buckle (29).

Figure 4:
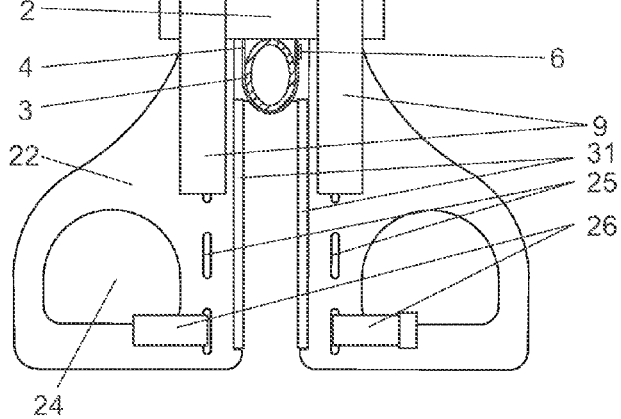
FIG. 4 is a rear view of the assembled components illustrated in FIGS. 1 to 3 showing one possible position of the mounting unit and top tube to which it may be operatively attached.
Figure 5:
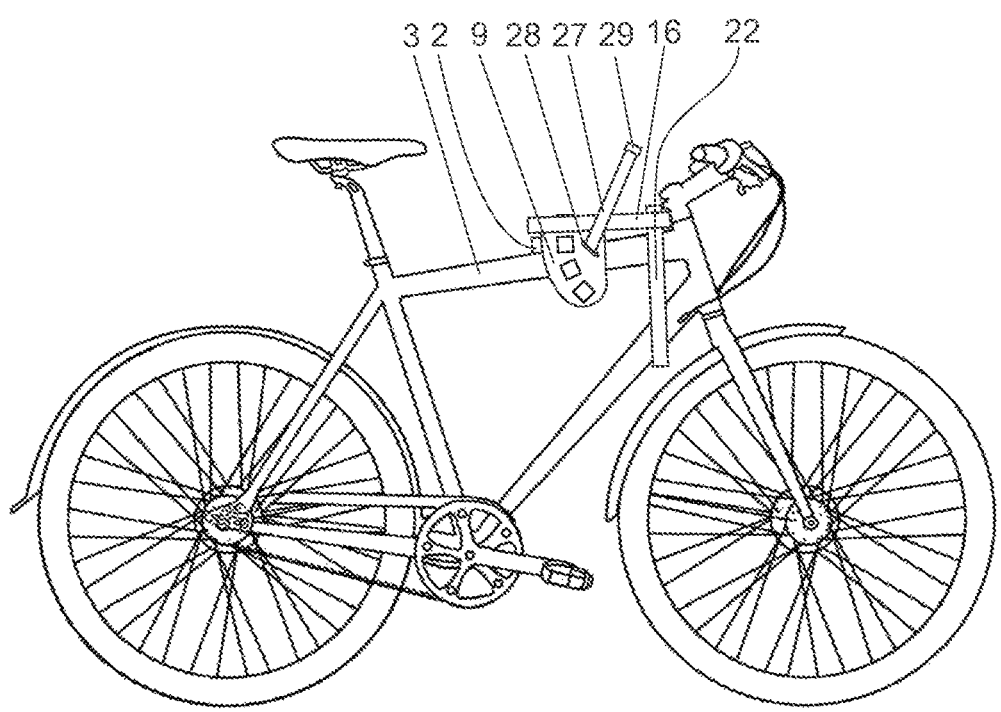
FIG. 5 is a side view of a bicycle fitted with the auxiliary child bicycle seat according to the first variation of the invention.

It is to be mentioned that the inner surfaces of the divide may be lined with a softer foam rubber or other material, as indicated by numeral (31) in FIG. 4. This not only provides an enhanced non-slip property to the surface contact with the bicycle frame but also adequately protects the finish of the bicycle against damage.

It will be understood that the child seat described above can be very easily assembled and disassembled whilst being totally secure in its assembled and operative condition. Absolutely no tools are required to assemble the child seat and only the straps need to be fastened appropriately. It also has many advantages over commercially available child seats that are often much more complicated and expensive. It is envisaged that the child seat of this invention will be particularly suitable for children between the ages of about 2 to about 5 years.

In use, a child seated on the seat panel can comfortably insert his or her feet in the foot rest apertures and is in a suitable position to grasp the handlebars of the bicycle. It is considered that this will be of particular value to the child as it will learn to know the movements of the handlebars.

One particular advantage of note is the fact that the various components are all made of what is a relatively soft material that is unlikely to damage any bicycle frame to which the child seat is attached. In any event, because of the nature of the material from which the components are made, any soft fabric or protective layer can be interposed between the components of the child seat and the bicycle frame.

Also, the generally soft nature of the material from which a child seat according to this invention is made will cause significantly less harm to a child and a cyclist in the event of an accident or other unscheduled or unexpected movement of a bicycle fitted with it.

Figure 6:
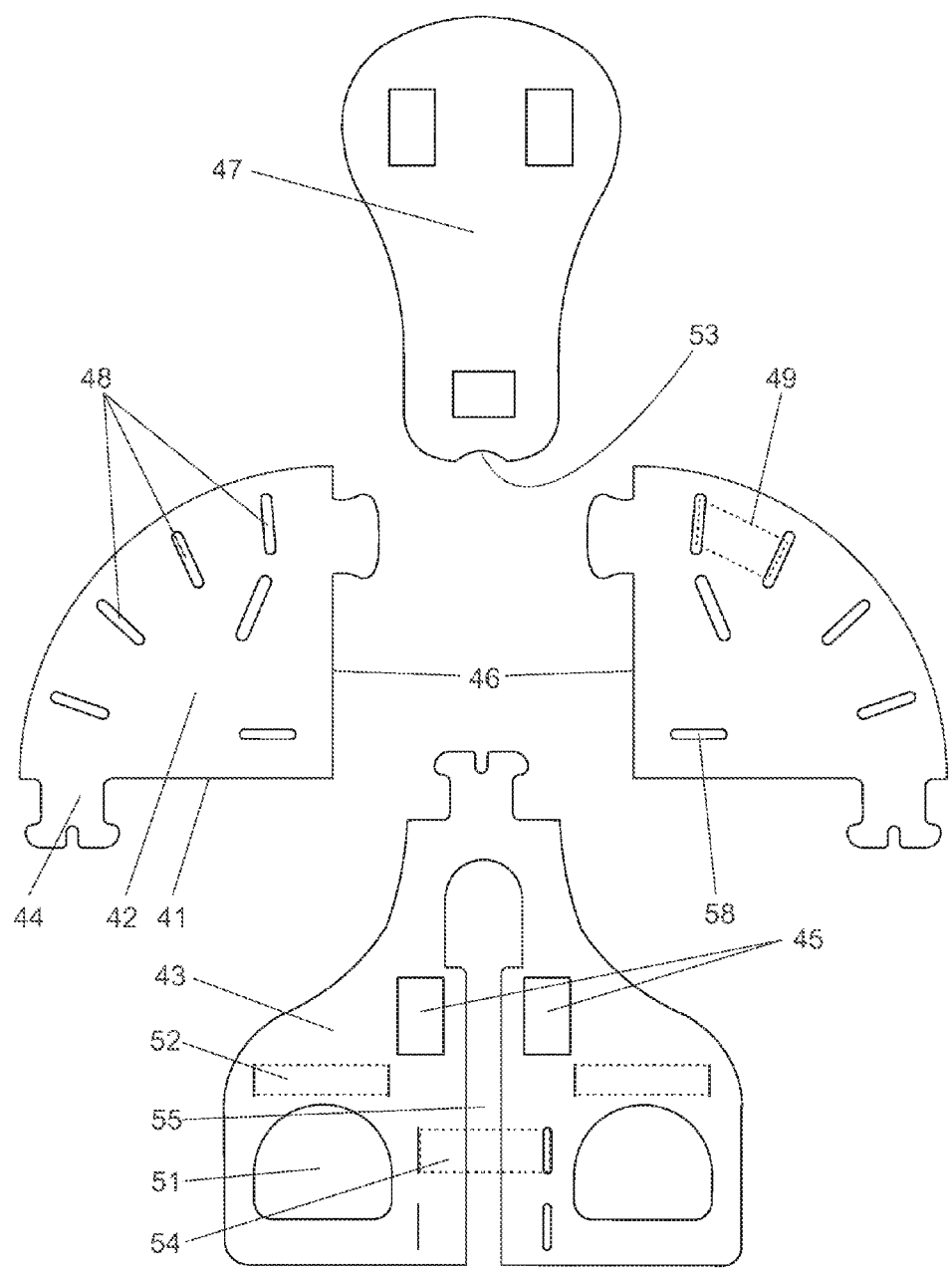
FIG. 6 is a view similar to FIG. 1 but of the components of an embodiment of the second variation of the invention.
Figure 7:
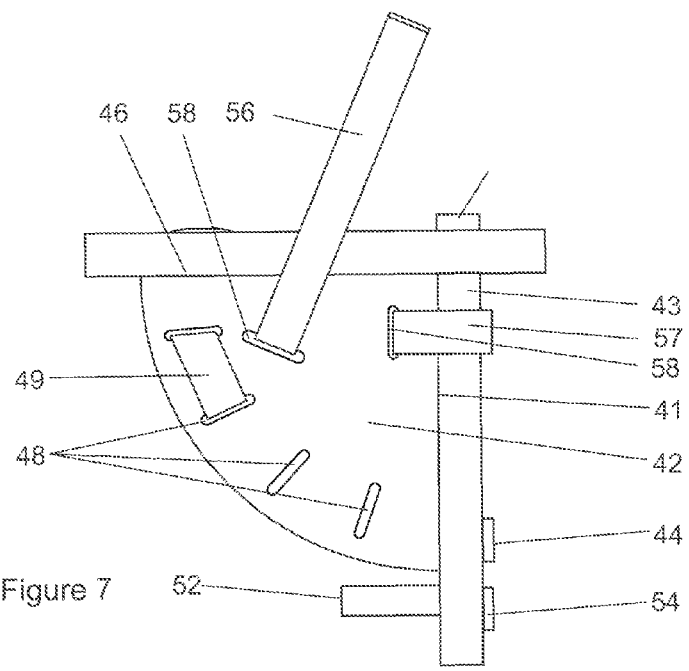
FIG. 7 is a view similar to FIG. 2 of the embodiment of the second variation of the invention the components of which are illustrated in FIG. 6; and, FIG. 8 is a view similar to FIG. 5 of part of a bicycle fitted with the auxiliary child bicycle seat of the second variation of the invention.
Figure 8:
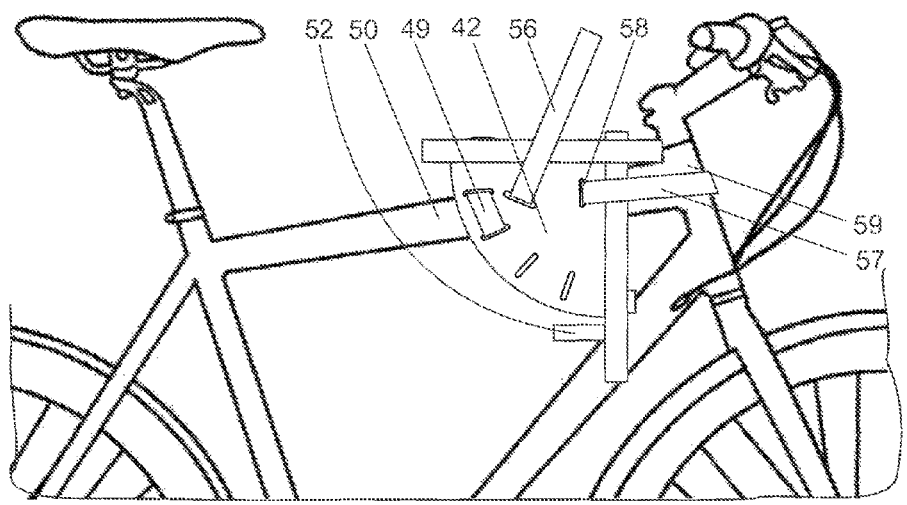

Turning now to the second variation of the invention the components of which are illustrated in plan view in FIG. 6 and the assembly of which is illustrated in side view in both FIGS. 7 and 8, the same basic principles apply in that the components of the auxiliary child bicycle seat are all die cut from a suitable prefabricated sheet of foam material or, they could alternatively be cast or otherwise moulded as indicated above.

The main difference between the first variation and the second variation of the invention is that the mounting unit is omitted in the second variation of the invention and a forward edge (41) of each of the upright seat support panels (42) actually contacts the surface of the front panel (43). Each of the forward edges has a headed tongue (44) with a bifurcating cut-out that registers with a co-operant aperture (45) in a lower region of the front panel in order to connect both of the seat support panels to the front panel directly.

In order to achieve this, the seat support panels are appreciably larger and have an upper edge (46) that in use supports or is immediately adjacent the seat panel (47) along a major portion of its length. The seat support panels can also contact or be immediately adjacent the front panel along a major portion of the upright forward edge (41) of the seat support panel. This arrangement enables one less component to be employed, namely the mounting unit.

Each of the seat support panels has an arcuate arrangement of a series of angularly spaced slots (48) arranged in an arc removed from the corner where the upper edge (46) meets the forward edge (41) so that straps (49) can be threaded through the slots in order to strap the seat support panels to a top tube of a bicycle frame. This is typically done using two passes of the strap with one pass being positioned above and one below the top tube (50) of a bicycle frame. This arrangement avoids the necessity of having the mounting unit.

FIGS. 6 to 8 also illustrate the fact that each of the footrest apertures (51) can have associated therewith an ankle strap (52) in order to hold a child's ankle and therefore foot relative to the front panel with the foot in the footrest aperture.

In addition, the front end of the seat panel is provided with a curved recess (53) in its leading edge for engaging the head tube or handlebar stem and thereby helping to locate the front of the seat centrally with respect to the bicycle frame.

FIG. 6 illustrates in dotted lines the ankle straps (52) and also a strap (54) used to close of the divide (55) of the front panel (43) in the installed position. FIG. 8 shows the lap strap (56); a strap (57) for passing through slots (58) near the front edges of the seat support panels and passing around the head tube (59) of the frame; and a strap (49) serving to hold the two seat support panels firmly in engagement with the top tube (50).

It should be noted that the general nature of the components that make up an auxiliary child bicycle seat according to this invention are totally suitable for packaging in a disassembled state in a flat pack arrangement such as in a generally flat box that can be sufficiently small, light in weight, and compact to be sent by mail. Such boxes or other flat packs are also well suited to transport and storage purposes on a space conservative basis.

Nevertheless, it is within the scope of this invention that a generally one-piece replica of an assembled auxiliary child bicycle seat according to the invention could be made as a single unit with the panels being integral with each other.

Numerous variations may be made to the embodiments of the invention described above without departing from the scope hereof.

The invention claimed is:

1. An auxiliary child bicycle seat comprising multiple components each of which is in the form of a generally flat foam body and wherein the components include two operatively upright seat support panels, a seat panel having formations cooperating with each of the seat support panels; and a front panel that has at least one formation cooperating with a cooperant formation on the seat panel or on the seat support panels or both, wherein the front panel is adapted to operatively extend downwards from a front region of the seat and the front panel has a central divide such that a portion of the front panel is located in use on each side of a top tube of a bicycle frame and wherein the front panel provides a footrest on each side of the divide.

2. An auxiliary child bicycle seat as claimed in claim 1 in which the components are cut from a prefabricated semi-rigid sheet of foam material having a suitable thickness and rigidity.

3. An auxiliary child bicycle seat as claimed in claim 1 in which the components are cast or moulded from a suitable foam material having an integral skin and a suitable thickness and rigidity.

4. An auxiliary child bicycle seat as claimed in claim 1 in which there are multiple formations on the seat support panels for use at different angles of inclination according to an angle of inclination of a top tube to which the auxiliary child bicycle seat is attached in use.

5. An auxiliary child bicycle seat as claimed in claim 4 in which selected formations on the components are tongues each of which is configured to fit neatly into a cooperating aperture through the other of two attached components.

6. An auxiliary child bicycle seat as claimed in claim 5 in which selected tongues are configured to pass through a cooperating aperture and have an enlarged head region for engaging behind remote edges of the cooperating aperture.

7. An auxiliary child bicycle seat as claimed in claim 1 in which the components have slots through them for receiving straps for any one or more purposes selected from holding the auxiliary child bicycle seat to the top tube of the bicycle frame, in use; for holding the various components together; for providing a lap strap for a child seated on the seat panel, in use; for holding a child's ankles captive relative to the footrests; for holding the front panel relative to a head tube of the bicycle frame or a handlebar stem; and for holding the central divide closed.

8. An auxiliary child bicycle seat as claimed in claim 1 which the seat panel has a central recess in a leading edge thereof for locating it relative to a head tube of a bicycle frame or a handlebar stem.

9. An auxiliary child bicycle seat as claimed in claim 1 in which the components include a mounting unit for attachment to the top tube of the bicycle frame, the mounting unit having formations in registration with co-operant formations on each of the two seat support panels to maintain their separation and generally parallel arrangement in use and slots passing through the mounting unit whereby it can be strapped to the top tube of the bicycle frame.

10. An auxiliary child bicycle seat as claimed in claim 9 in which the mounting unit has laterally extending tongues with heads for engaging in cooperating apertures in the seat support panels.

11. An auxiliary child bicycle seat as claimed in claim 1 in which the seat support panels each have a forward edge with formations in the form of tongues for connecting them to the front panel and a series of angularly spaced slots through the seat support panels that enable a strap to be threaded through the slots in order to strap the seat support panels to the top tube of the bicycle frame with two passes of a strap being positioned one above and one below the top tube of the bicycle frame.

12. An auxiliary child bicycle seat as claimed in claim 1 in which one of a pair of cooperating slots is in the form of a simple slit through one of the seat panel, seat support panels, and front panel through which a strap can be passed so that it is held captive by friction relative to that slot and can be threaded through a co-operating slot as and when required.

13. An auxiliary child bicycle seat as claimed in claim 1 in which a thickness of all of the panels is the same.

14. An auxiliary child bicycle seat as claimed in claim 1 in which the components are packed in a co-planar manner to form a flat pack.

15. An auxiliary child bicycle seat conforming in general shape to an assembled child bicycle seat as claimed in claim 1 wherein the seat panel is attached to the seat support panels; and a front panel attached to the seat panel or the seat support panels or both wherein at least the seat panel, the seat support panels and front panel are integrally moulded.

* * * * *